United States Patent

Wichman

[11] Patent Number: 5,930,240
[45] Date of Patent: Jul. 27, 1999

[54] RADIO FREQUENCY COMMUNICATION SYSTEM WITH A REPEATER THAT OPERATES WITH A TIME DIVISION MULTIPLE ACCESS PROTOCOL

[75] Inventor: Johan Wichman, Bjarred, Sweden

[73] Assignee: Telia AB, Farsta, Sweden

[21] Appl. No.: 08/750,148

[22] PCT Filed: May 30, 1995

[86] PCT No.: PCT/SE95/00610

§ 371 Date: Jan. 29, 1997

§ 102(e) Date: Jan. 29, 1997

[87] PCT Pub. No.: WO95/35603

PCT Pub. Date: Dec. 28, 1995

[30] Foreign Application Priority Data

Jun. 10, 1994 [SE] Sweden ................................. 9402028

[51] Int. Cl.⁶ ........................................................ H04B 7/14
[52] U.S. Cl. .......................... 370/315; 370/328; 370/336
[58] Field of Search .................................... 370/315, 328, 370/336, 337, 345, 347, 437, 442, 280; 455/11.1

[56] References Cited

U.S. PATENT DOCUMENTS 4,713,809   12/1987   Mizota ...................................... 370/315
5,113,394   5/1992    Kotzin ...................................... 370/315
5,365,590   11/1994   Brame .
5,371,734   12/1994   Fischer ...................................... 370/311

FOREIGN PATENT DOCUMENTS 0 605 182 A2   7/1994   European Pat. Off. .
0 637 144 A1   2/1995   European Pat. Off. .
WO 92/09148    5/1992   WIPO .

Primary Examiner—Jeffery A. Hofsass
Assistant Examiner—Mitchell Slavitt
Attorney, Agent, or Firm—Oblon, Spivak, McClelland, Maier & Neustadt, P.C.

[57] ABSTRACT

In a mobile radio system, which comprises densely positioned base stations working with a short range between the affected base stations and mobile units, repeating functions are carried out by means of a simplified variant of a base station. This simplified variant of a base station is positioned between the ordinary base station and the mobile unit, which simplified variant of a base station receives a respective message and forwards the message to the affected mobile unit.

16 Claims, 1 Drawing Sheet

RADIO FREQUENCY COMMUNICATION SYSTEM WITH A REPEATER THAT OPERATES WITH A TIME DIVISION MULTIPLE ACCESS PROTOCOL

TECHNICAL AREA

The present invention relates to an arrangement for, in a digital mobile radio communication system comprising on the one hand densely positioned base stations working with a short range and on the other hand mobile units, extending the range by means of repeating functions.

STATE OF THE ART

In radio systems, preferably digital radio systems, which are used in local applications, the coverage between a base station forming part of the system and a mobile unit belonging to the base station is limited to the area of coverage of the base stations. In general public radio-relay systems, it is already known, through patent specification EP A 2 092 237, to utilize a repeating function. The repeating function repeats a first sequence of downward time slots, in a first time frame, from the first to the second station as a second sequence of downward time slots, in a second time frame. The repeater function also transmits a first series of increasing time slots to the first station which answers a second series of upward time slots received from the second station.

In association with mobile radio systems belonging to this category with poor range in relation to the median in length of the radio link, a number of methods have been proposed for improving the coverage between the mobile units and the base stations. The proposals which have been put forward have, however, resulted in drawbacks with delays of the speech or data connections. No known technology for improving the range between mobile units and a base station in local networks which results in high capacity, adequate range, security and quality has previously existed.

DESCRIPTION OF THE INVENTION

TECHNICAL PROBLEM

The modern local radio systems of today presuppose the greatest possible range between the transmitter and receiver of the base stations and the mobile units at the same time as the greatest possible consideration can be given to radio systems being assigned to work in high frequency bands, preferably above 100 MHz, which gives a poor range in relation to the median attenuation of the radio link. On the other hand, a small part of the radio link has very high attenuation. In order to obtain adequate signal strength, the low attenuation link must therefore be significantly reduced as the high attenuation link cannot be changed for application reasons.

The problem can be exemplified with the radio-based local network application OMA (area-limited mobile access). The application means that the terminated cord connection to the subscriber is replaced by radio. The telephone exchange is connected to a radio base at a suitable distance from the subscriber, e.g. 500 meters. The radio base can connect a large number of subscribers within the coverage area. The subscriber, whose usual cord telephone is replaced by one or more cordless telephones, is offered an area-limited mobility. This means that costs for maintenance and running cables can be minimized. This presupposes, however, that adequate range can be obtained. Ongoing testing activity has shown that this type of system gives OMA ranges of less than 100 meters. The explanation for this relatively low range is that the signal strength is greatly damped when the radio wave is to penetrate the building or the ground. The invention intends to solve these problems among others.

In one embodiment of the subject of the invention, the use of a time multiplex protocol is utilized, in which protocol messages are to be capable of being transmitted in time slots divided in time frames in such a manner that drawbacks with delays of speech or data connections do not arise. The invention intends to solve this problem also.

In one embodiment of the subject of the invention, an influencing function is utilized, in which influencing function time slots are to be capable of being assigned in such a manner that capacity is increased in the critical coverage area of the mobile system. The invention intends to solve this problem also.

In one embodiment of the subject of the invention, the repeating function selects which time slots can be selected for the transmission in which it is engaged. This is to be capable of taking place in such a manner that the mobile unit or the base station can set up direct connections. The invention intends to solve this problem also.

In one embodiment of the subject of the invention, the radio-based communication system works within an assigned frequency band, this frequency band is to be applied in such a manner that it is suited for local outdoor/indoor communication. The invention intends to solve this problem also.

In one embodiment of the subject of the invention, influences of the radio communication system are utilized, in which influences the traffic is to be capable of being controlled via the repeating function in a manner which is favourable and flexible for the system. The invention intends to solve this problem also.

In one embodiment of the subject of the invention, transmission of a message in time slots put together to form time frames is utilized. This transmission is to be capable of being carried out in such a manner that the quality of speech or data connections is not made worse. The invention intends to solve this problem also.

In one embodiment of the subject of the invention, said repeating function is connected between the respective base station and the respective mobile units, in which connection running cable to base stations is to be capable of being avoided.

SOLUTION

It can primarily be considered to be characteristic of an arrangement according to the invention that a repeating function is effected/carried out with a simplified variant of a base station. This simplified variant of a base station is positioned between an ordinary base station and the mobile unit. A further characteristic is that the simplified variant of the base station is made in such a manner that it receives each message which is transmitted from an affected base station or mobile unit addressed to an affected mobile unit or base station and subsequently forwards the message to the affected mobile unit or base station.

In one embodiment of the inventive idea, said repeating function of a message is arranged in a digital radio system which works in accordance with a time multiplex protocol which utilizes the frame structure in TDMA/TDD technology.

In a further embodiment of the inventive idea, the digital radio-based communication system is arranged with time frames divided up into a number of time slots, where half the time slots are used for signalling in a downlink. The other half is utilized for an uplink. There, given selected time slots in a respective time frame are assigned for transmitting said message to or from said repeating function.

In a further embodiment of the inventive idea, the repeating function is arranged to influence the number of time slots per link in order to increase capacity within critical areas in the coverage area of the mobile system.

In a further embodiment of the inventive idea, messages which are transmitted in the radio-based communication system can be transmitted from a base station/mobile unit to a mobile unit/base station without said repeating function being called or activated. This means that the repeating function is to determine which time slots can be selected for a transmission in which it is engaged.

In a further embodiment of the inventive idea, the radio-based communication system, base stations and mobile units are assigned a frequency, a frequency area, which is suited for local communication outdoors or indoors (greater than 100 MHz).

In a further embodiment of the inventive idea, the radio communication system can be influenced for reasons of capacity in order to make it possible for a user or customer to force the system, for a variable time or continuously, to transmit all messages between a respective ordinary base station and a respective mobile unit via the repeating function.

In a further embodiment of the inventive idea, messages which have been received by the repeating function are transmitted on to the respective affected mobile unit/ordinary base station within the same time frame but transmitted to the repeating function.

In a further embodiment, the repeating function is connected cordlessly between an ordinary base station and a mobile unit.

In a further embodiment of the inventive idea, said radio communication system is arranged with one or more members for receving or transmitting messages. A further characteristic is that the members can be called from a respective base station/mobile unit and that the respective members for receiving or transmitting a message are arranged to receive a message from a respective base station/mobile unit. The members for receiving or transmitting a message are arranged to transmit said message to a respective affected (addressed) mobile unit/base station.

ADVANTAGES

By means of what is proposed above, an effective radio-based local communication system can be established, in which a respective mobile unit can move within a larger coverage area at the same time as consideration is given to the communication system being assigned a frequency greater than 100 MHz, which gives a poor range in relation to the median attenutation of the radio link. It should be easier/cheaper to cover larger areas as the range of the digitally based radio system can be increased greatly. Subscribers utilizing mobile units in the system obtain greater surface coverage. The arrangement is specially suited in applications when the full capacity of the systems is not required. A typical example of this is DECT (Digital European Cordless Telecommunication) in a local network (often called Cordless Local Loop), where the range sometimes can be required to be improved and where covered capacity is much greater than what is required.

DESCRIPTION OF THE FIGURES

A for the present proposed embodiment of an arrangement which has the characteristics which are significant of the invention is to be described below with simultaneous reference to the attached drawings, in which.

FUNCTIONING EMBODIMENT

Figure 1:
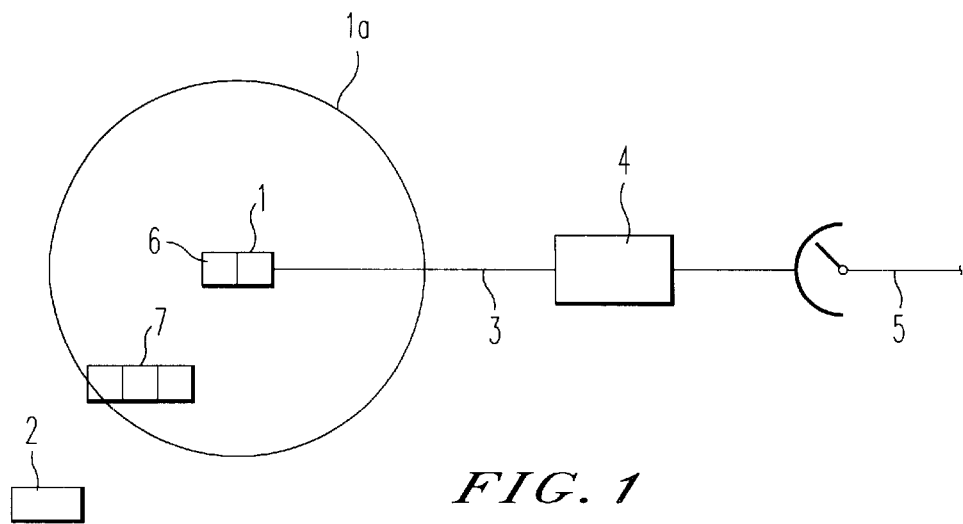
FIG. 1 shows in block diagram form a preferred embodiment of the invention.

In FIG. 1, a mobile telecommunication system comprising on the one hand a number of base stations, one is here indicated as 1, working with coverage areas, which are indicated as la, and on the other hand one or more mobile units, one is here indicated as 2. The mobile communication system works with frequencies above 100 MHz and therefore has poor range in relation to the median attenuation of the radio link. A large part of the radio link has low attenuation. On the other hand, a small part of the radio link has very high attenuation. The mobile communication system can be constituted by a system known per se working with a TDMA structure, e.g. DECT, DCS 1800 and DCT 900. The system which is shown in the figure is a typical DECT (Digital European Cordless Telecommuincation in a local network), (often called Cordless Local Loop), where the range may sometimes need to be improved, and where the capacity of DECT is much greater than is required. The base station 1 shown in the figure is connected, via an exchange-connected connection, to a telephone exchange 4. The telephone exchange 4 is a subscriber exchange (often called PABX) connected to the general telephone network 5. Conversations/calls to a mobile unit 2 sought in the system come in via the general telephone network 5 and are connected to the telephone exchange 4. From the telephone exchange 4, a search call goes out to the base is station 1 via the connection of the exchange connection 3. The base station 1 is provided with a transmitting and receiving member 6. The information-transmitting and receiving member 6 of the base station 1 transmits calls to the mobile unit 2 sought. The mobile unit 2 sought lies outside the coverage area la of the affected base station 1 and cannot therefore directly receive/detect said calls. A repeating function 7 is positioned within the coverage area la of the affected mobile unit 1 and perceives said calls. The repeating function 7 is in principle a simplified base station 1. The repeating function 7 repeats the call/the message which is transmitted from the base station 1 on to the affected mobile unit which lies outside the coverage area la of the affected base station 1. Repeating of the call/the message takes place within the same time frame as the affected base station 1 transmits the call/the message. In the same manner, the repeating function 7 carries out reception and transmission of information from the mobile unit 2 on to the transmitting and receiving function 6 of the affected base station 1. The repeating function 7 does not need to carry out encoding/decoding. The transmission of the repeating function 7 takes place in four parts of a time frame in the following time sequence: base station 1 to repeating function 7, repeating function 7 to mobile unit 2, mobile unit 2 to repeating function 7, repeating function 7 to base station 1. It is the repeating function 7 which determines which time slots are to be selected for a transmission in which it is engaged. This means that it can e.g. be possible for a mobile unit 2 to create a direct connection (without the repeating function 7) to the transmitting and receiving member 6 of the base station 1. The mobile unit 2 and the base station 1 do not need to be modified in order to work with the repeating function, provided that they can listen to and follow the desires of the repeating function about which time slots are permitted.

For reasons of capacity, it may be an advantage also to implement given software in the mobile unit 2 or base station 1, which makes it possible for the user (the operator or the customer) to force (where appropriate temporarily) the system to utilize the repeating function 7. This means that calls on prohibited time slots can be prevented. In the event that no extra software is installed in the mobile unit 2 or the base station 1, the repeating function 7 is forced to inform the calling mobile unit 2 or base station 1 that another time slot is to be used when the repeating function 7 determines that a communication range between the mobile unit 2 and the base station 1 is too great to reliably close the link without using the repeating function 7. The use by the repeating function 7 of time slots in the time frames increases the range of the system at the cost of a reduced total capacity in the network. This is of particular interest as far as the introduction of new systems (e.g. DCS 1800, DECT etc.) is concerned, where one of the initial problems is to keep adequate range.

Figure 2:
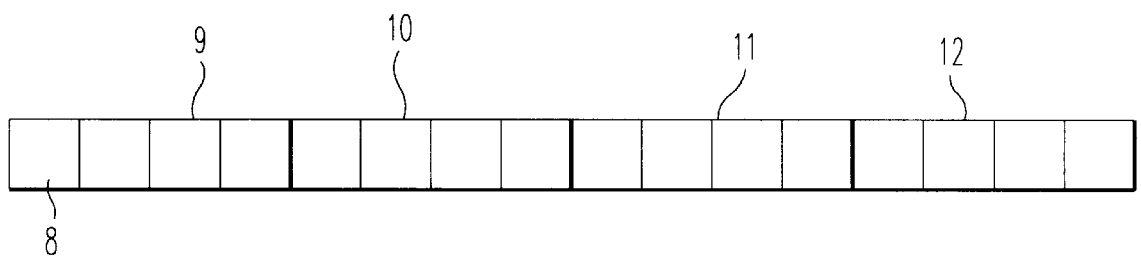
FIG. 2 shows in block diagram form a time frame structure for transmitting messages in a TDMA system.

In FIG. 2, a preferred TDMA time frame is shown. The number of time slots 8 has been selected as 16 (DCT 900). The time frame is divided into four units 9, 10, 11 and 12. Each part of the time frame 9, 10, 11 and 12 contains four time slots 8. The first part of the time frame 9 is used for transmitting information/messages from the base station to the repeating function. The second part of the time frame 10 is used for transmitting information/messages from the repeating function to the mobile unit. The third part of the time frame 11 is used for transmitting information from the mobile unit to the repeating function. The fourth part of the time frame 12 is used for transmitting information from the repeating function to the base station. The division of the time slots 8 in the frame is always to follow the principle in the figure. However, the number of time slots 8 per part 9, 10, 11 and 12 can be selected differently in order in such a manner to increase the capacity in critical parts in the mobile communication system. For radio-based local network applications which are area-limited, transmission from the base station to the repeating function or from the repeating function to the base station is the critical part. The TDMA time frame can therefore be divided with regard to this. The number of time slots 8 in the time frame can also vary, e.g. the mobile communication system DECT can be mentioned which has twenty four time slots.

The simplified base station does not need to carry out any encoding/decoding of messages from base station to user unit and vice versa apart from, in case of need, being capable of reading or making small changes to the control field of the message.

Messages which have been received by said repeating function are transmitted on to the respective affected user unit/mobile unit/ordinary base station within the same or the next time frame as it is transmitted to said repeating function. Repeating in the next time frame may, however, only take place in one direction, i.e. repeating within the same time frame is always to take place towards the user unit and/or towards an ordinary base station.

The mobile unit can be constituted by a user unit of different type to the mobile unit.

The invention is not limited to the embodiment shown above as an example but can be subjected to modifications within the scope of the following patent claims and the inventive idea.

I claim:

1. A radio frequency communication system comprising:
  a base station coupled to a public switched telephone network;
  a mobile station configured to communicate with the base station over a wireless two-way communication link that operates at frequencies of 100 MHZ or greater; and
  a repeater positioned between said base station and said mobile station, wherein
  said repeater configured to relay messages between the base station and said mobile station without performing an encoding/decoding function on non-control field portions of said messages,
  said wireless two-way communication link using a time division multiple access, TDMA, protocol where each segment of said wireless two-way communication link being assigned to separate parts of a TDMA frame, and at least one TDMA time slot within each separate part of the TDMA frame hosting at least a portion of said non-control field portions of at least one of said messages,
  said repeater being configured to assign, for either continuous operation or time varying operation, one of the separate parts for relaying said message in a first direction and another of the separate parts for forwarding a reply message in a reverse direction, where said assignment being based on an available traffic capacity of a communication coverage area that includes the base station and mobile station,
  said repeater configured to relay the message in the first direction within a same TDMA frame or in a next TDMA frame so as to complete the wireless two-way communication link between the base station and the mobile station, and
  widths of the separate parts of the TDMA frame being substantially equivalent.

2. The system of claim 1, wherein:
a first set of contiguous time slots hold the message when sent in the first direction from the base station to a mobile station and another set of contiguous time slots hold a reply message sent from the mobile station to the base station.

3. The system of claim 1, wherein:
said repeater being configured to assign said at least one TDMA time slot based on an available traffic capacity of traffic handled by said repeater.

4. The system of claim 1, wherein:
said repeater being configured to relay all messages between said base station and said mobile station, and all reply messages from said mobile station to said base station.

5. The system of claim 1, wherein:
said repeater is configured to assign the at least one TDMA time slot for holding the message when sent in the first direction in a same frame as a reply message sent from the mobile station to the repeater.

6. The system of claim 1, wherein:
said repeater being arranged to be called to perform the repeating operation by at least one of said base station and said mobile station such that said repeater performs a repeating operation so as to relay the message between the base station and the mobile station.

7. The system of claim 2, wherein:
said repeater being configured to assign said at least one TDMA time slot based on an available traffic capacity of traffic handled by said repeater.

8. The system of claim 2, wherein:
said repeater being configured to relay all messages between said base station and said mobile station, and all reply messages from said mobile station to said base station.

9. The system of claim 3, wherein:

said repeater being configured to relay all messages between said base station and said mobile station, and all reply messages from said mobile station to said base station.

10. The system of claim 2, wherein:

said repeater is configured to assign the at least one TDMA time slot for holding the message when sent in the first direction in a same frame as a reply message sent from the mobile station to the repeater.

11. The system of claim 3, wherein:

said repeater is configured to assign the at least one TDMA time slot for holding the message when sent in the first direction in a same frame as a reply message sent from the mobile station to the repeater.

12. The system of claim 4, wherein:

said repeater is configured to assign the at least one TDMA time slot for holding the message when sent in the first direction in a same frame as a reply message sent from the mobile station to the repeater.

13. The system of claim 2, wherein:

said repeater being arranged to be called to perform the repeating operation by at least one of said base station and said mobile station such that said repeater performs a repeating operation so as to relay the message between the base station and the mobile station.

14. The system of claim 3, wherein:

said repeater being arranged to be called to perform the repeating operation by at least one of said base station and said mobile station such that said repeater performs a repeating operation so as to relay the message between the base station and the mobile station.

15. The system of claim 4, wherein:

said repeater being arranged to be called to perform the repeating operation by at least one of said base station and said mobile station such that said repeater performs a repeating operation so as to relay the message between the base station and the mobile station.

16. The system of claim 5, wherein:

said repeater being arranged to be called to perform the repeating operation by at least one of said base station and said mobile station such that said repeater performs a repeating operation so as to relay the message between the base station and the mobile station.

* * * * *